UNITED STATES PATENT OFFICE 2,414,892

PREPARATION OF SULFONAMIDE COMPOUNDS

Peter Oxley and Wallace Frank Short, Nottingham, England, assignors to Boots Pure Drug Company Limited, Nottingham, England, a company of Great Britain No Drawing. Application October 2, 1944, Serial No. 556,910. In Great Britain October 19, 1943

6 Claims. (Cl. 260—296)

This invention relates to the preparation of sulphonamide compounds which contain the amidine group

and which possess therapeutic properties, of which p-sulphamidobenzamidine,

is an example.

This compound may be produced in the form of its hydrochloride by a known process which consists in converting p-cyanobenzene sulphonamide into p-sulphamidobenzimino-ether hydrochloride by the action of anhydrous alcoholic hydrochloric acid and then allowing the resulting product to react with alcoholic ammonia.

The present invention aims at providing an improved method for the manufacture of the p-sulphamidobenzamidine and other sulphonamides containing the amidine group.

The process according to the invention consists in converting benzamidine p-sulphonic acid to the acid chloride, for example, by the action of chlorsulphonic acid and then treating the acid chloride with ammonia or an amine to produce the desired sulphonamide compound. This compound is p-sulphamidobenzamidine in the case when the acid chloride is treated with ammonia. The process takes place according to the following scheme:

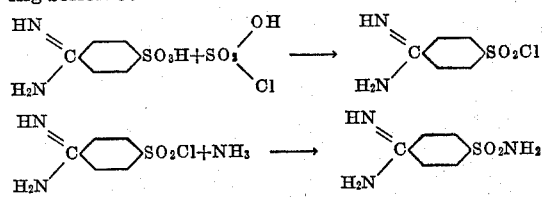

The benzamidine p-sulphonic acid,

which is the starting material in the process may be produced by the known methods of heating sulphamidobenzoic acid alone or by heating sulphobenzoic acid with benzene sulphonamide. It is, however, preferred to produce it from p-sulphamidobenzoic acid, $C_6H_4.COOH.SO_2.NH_2$, which is a by-product from the manufacture of saccharin and is readily available, by heating that acid with another sulphonamide, for example, benzene sulphonamide. Thus, if one molecular amount of p-sulphamidobenzoic acid is heated with 1 to 1.5 molecular amounts of the benzene sulphonamide or other sulphonamide, the desired benzamidine p-sulphonic acid is obtained in good yield.

In order that the invention may be clearly understood and readily carried into effect, some examples of the novel process will now be set forth in detail.

Example 1

In the preparation of p-sulphamidobenzamidine, one mode of proceeding consists in dissolving 2.0 gms. (0.01 mol.) of benzamidine-p-sulphonic acid in 5.8 gms. (0.05 mol.) of chlorsulphonic acid and warming the solution to 100° C. for half an hour. The solution is then poured on to 25 gms. of ice with vigorous stirring and an excess (15 c. c.) of 0.880 ammonia is added at once to the clear solution with sufficient ice to keep the temperature below 10° C. A crystalline precipitate of almost pure p-sulphamidobenzamidine is rapidly formed with a yield of 1.2 gms. or 60 per cent of the theoretical.

Example 2

In the preparation of p-sulphamidobenzamidine by another method, 2.0 gms. (0.01 mol.) of benzamidine-p-sulphonic acid is converted into the sulphonylchloride by warming with 2 mls. (0.03 mol.) of chlorsulphonic acid and 0.80 ml. (0.011 mol.) of thionyl chloride under reflux at 80° C. for about 30 minutes until evolution of gas ceases. The reaction product which consists of an almost colourless clear solution is poured on to ice, the solution filtered and concentrated ammonia solution added until the solution is alkaline to brilliant yellow. In a very short time, p-sulphamidobenzamidine crystallises from the solution, is filtered off, washed and dried in vacuo.

Example 3

In the preparation of 2-(4[1]-aminobenzenesulphonamide)-thiazole, 2 gms. (0.01 mol.) of benzamidine-p-sulphonic acid, 1 ml. (0.015 mol.) of chlorsulphonic acid and 0.75 ml. (0.01 mol.) of thionyl chloride are warmed as in Example 2 and after cooling the product, 15 mls. of pyridine and 3 gms. of 2-amino-thiazole are added to the solution. The resulting solution is heated at 100° C. during 3 hours and it is then cooled and diluted with 50 mls. of water.

The solution is then rendered neutral to phenol-phthalein by the addition of about 9 mls. of 5N caustic soda solution. Pyridine is removed by evaporating in vacuo at room temperature and the required amidine then separates. It melts at about 234° C. and may be purified by conversion into its benzenesulphonate, which melts at 280–281° C. or its picrate which melts at 261–262° C.

It will be understood that as an alternative to the use of amino-thiazole mentioned in the above example, the acid chloride may be treated with other amines, such as amino-pyridine, and the corresponding sulphonamide compounds obtained.

We claim:

1. A process for the preparation of sulphonamide compounds which contain the amidine group, which comprises the steps of converting benzamidine p-sulphonic acid into the acid chloride and reacting the acid chloride obtained with a substance selected from the group consisting of ammonia and amines.

2. A process for the preparation of sulphonamide compounds which contain the amidine group, which comprises the steps of converting benzamidine p-sulphonic acid into the acid chloride by treatment with chlorsulphonic acid and reacting the acid chloride obtained with a substance selected from the group consisting of ammonia and amines.

3. A process for the preparation of sulphonamide compounds which contain the amidine group, which comprises the steps of converting benzamidine p-sulphonic acid into the acid chloride and reacting the acid chloride obtained with a heterocyclic amine.

4. A process for the preparation of sulphonamide compounds which contain the amidine group, which comprises the steps of converting benzamidine p-sulphonic acid into the acid chloride and reacting the acid chloride obtained with aminopyridine.

5. A process for the preparation of sulphonamide compounds which contain the amidine group, which comprises the steps of converting benzamidine p-sulphonic acid into the acid chloride and reacting the acid chloride obtained with aminothiazole.

6. A process for the preparation of sulphonamide compounds which contain the amidine group, which comprises the steps of heating p-sulphamidobenzoic acid with a benzenesulphonamide to form benzamidine-p-sulphonic acid, converting the benzamidine-p-sulphonic acid into the acid chloride and reacting the acid chloride obtained with a substance selected from the group consisting of ammonia and amines.

PETER OXLEY.
WALLACE FRANK SHORT.